US012151346B2

(12) United States Patent
Fu

(10) Patent No.: US 12,151,346 B2
(45) Date of Patent: Nov. 26, 2024

(54) LOCKING PLIERS WITH IMPROVED ADJUSTMENT

(71) Applicant: APEX BRANDS, INC., Apex, NC (US)

(72) Inventor: Zhihong Fu, Cary, NC (US)

(73) Assignee: Apex Brands, Inc., Apex, NC (US)

(*) Notice: Subject to any disclaimer, the term of this patent is extended or adjusted under 35 U.S.C. 154(b) by 374 days.

(21) Appl. No.: 17/496,421

(22) Filed: Oct. 7, 2021

(65) Prior Publication Data

US 2022/0105606 A1 Apr. 7, 2022

Related U.S. Application Data

(60) Provisional application No. 63/088,808, filed on Oct. 7, 2020.

(51) Int. Cl.
*B25B 7/04* (2006.01)
*B25B 7/12* (2006.01)

(52) U.S. Cl.
CPC . *B25B 7/04* (2013.01); *B25B 7/12* (2013.01)

(58) Field of Classification Search
CPC .................................... B25B 7/04; B25B 7/12
USPC ........................................................... 81/385
See application file for complete search history.

(56) References Cited

U.S. PATENT DOCUMENTS

| | | | | | |
|---|---|---|---|---|---|
| 244,269 | A * | 7/1881 | Lovrien | B25B 7/10 | 81/402 |
| 2,399,454 | A * | 4/1946 | Snell | B25B 7/123 | 81/402 |
| 2,518,173 | A * | 8/1950 | Pepperdine | B25B 7/123 | 81/367 |
| 4,559,805 | A * | 12/1985 | McClure | B21D 39/025 | 72/319 |
| 6,408,724 | B1 * | 6/2002 | Whiteford | B25B 7/123 | 81/367 |

* cited by examiner

*Primary Examiner* — Hadi Shakeri
(74) *Attorney, Agent, or Firm* — Burr & Forman LLP

(57) ABSTRACT

A hand tool includes a handle assembly, a jaw assembly, a clamping assembly, and an adjustment assembly. The handle assembly may include a first handle and a second handle that each have a proximal end and a distal end. The jaw assembly may include a first jaw and a second jaw. The first jaw may be pivotally attached to a proximal end the first handle and the second jaw being pivotally attached to a proximal end of the second handle. The clamping assembly may be configured to enable the first and second jaws to be locked at a selected distance from each other in a locked position. The adjustment assembly may be disposed at an intersection of the jaw assembly and the handle assembly. The adjustment assembly may be configured to enable the selected distance to be modified.

20 Claims, 6 Drawing Sheets

LOCKING PLIERS WITH IMPROVED ADJUSTMENT

TECHNICAL FIELD

Example embodiments generally relate to hand tools and, in particular, relate to a locking pliers that can be easily adjusted.

BACKGROUND

Hand tools are commonly used across all aspects of industry and in the homes of consumers. Hand tools are employed for multiple applications including, for example, tightening, component joining, and/or the like. For some applications, a locking pliers may be preferred. These familiar hand tools typically include jaws that can be locked into position after passing an over-center or other balance or tipping point position. In this regard, the jaws can effectively be locked in a clamping position and will remain closed in the clamping position after being locked until some unlocking action or force is initiated.

Modern conventional locking pliers often include an adjustment assembly, which enables the distance between the top and bottom jaws when the pliers is locked to be adjusted. The adjustment is conventionally made via a screw that is located at a distal end of the top handle (relative to the jaws). In this regard, the adjusting screw extends out of the distal end of the top handle and must be adjusted either when no gripping action is taking place or, if during a gripping action, by the hand opposite the hand engaging the locking pliers for the gripping action. Since it is not uncommon for users to attempt to size the distance between jaws dynamically while preparing to engage in a gripping operation, using two hands to adjust the locking pliers effectively becomes almost a rule.

In addition to being more complicated, two-hand operation of the locking pliers may be impractical for certain operations (e.g., where the operator needs to hold another piece of equipment or a pipe or component that is to be gripped with the locking pliers). Thus, it may be desirable to provide a structure for a locking pliers that improves the ability of an operator to adjust the locking pliers, perhaps even with the use of just one hand.

BRIEF SUMMARY OF SOME EXAMPLES

In an example embodiment, a hand tool may be provided. The hand tool includes a handle assembly, a jaw assembly, a clamping assembly, and an adjustment assembly. The handle assembly may include a first handle and a second handle that each have a proximal end and a distal end. The jaw assembly may include a first jaw and a second jaw. The first jaw may be pivotally attached to a proximal end the first handle and the second jaw being pivotally attached to a proximal end of the second handle. The clamping assembly may be configured to enable the first and second jaws to be locked at a selected distance from each other in a locked position. The adjustment assembly may be disposed at an intersection of the jaw assembly and the handle assembly. The adjustment assembly may be configured to enable the selected distance to be modified.

In another example embodiment, an adjustment assembly for adjusting an adjustable locking pliers having a handle assembly and a jaw assembly may be provided. The handle assembly may include a first handle and a second handle and the jaw assembly may include a first jaw and a second jaw.

The adjustment assembly may include an adjuster disposed at an intersection of the jaw assembly and the handle assembly, a threaded receiver, and an adjustment slot. The locking pliers may further include a clamping assembly configured to enable the first and second jaws to be locked at a selected distance from each other in a locked position. The adjuster may be configured to interface with the threaded receiver to enable extending or shortening an exposed length of the adjuster based on an amount of the adjuster that is received in the threaded receiver to define the selected distance.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
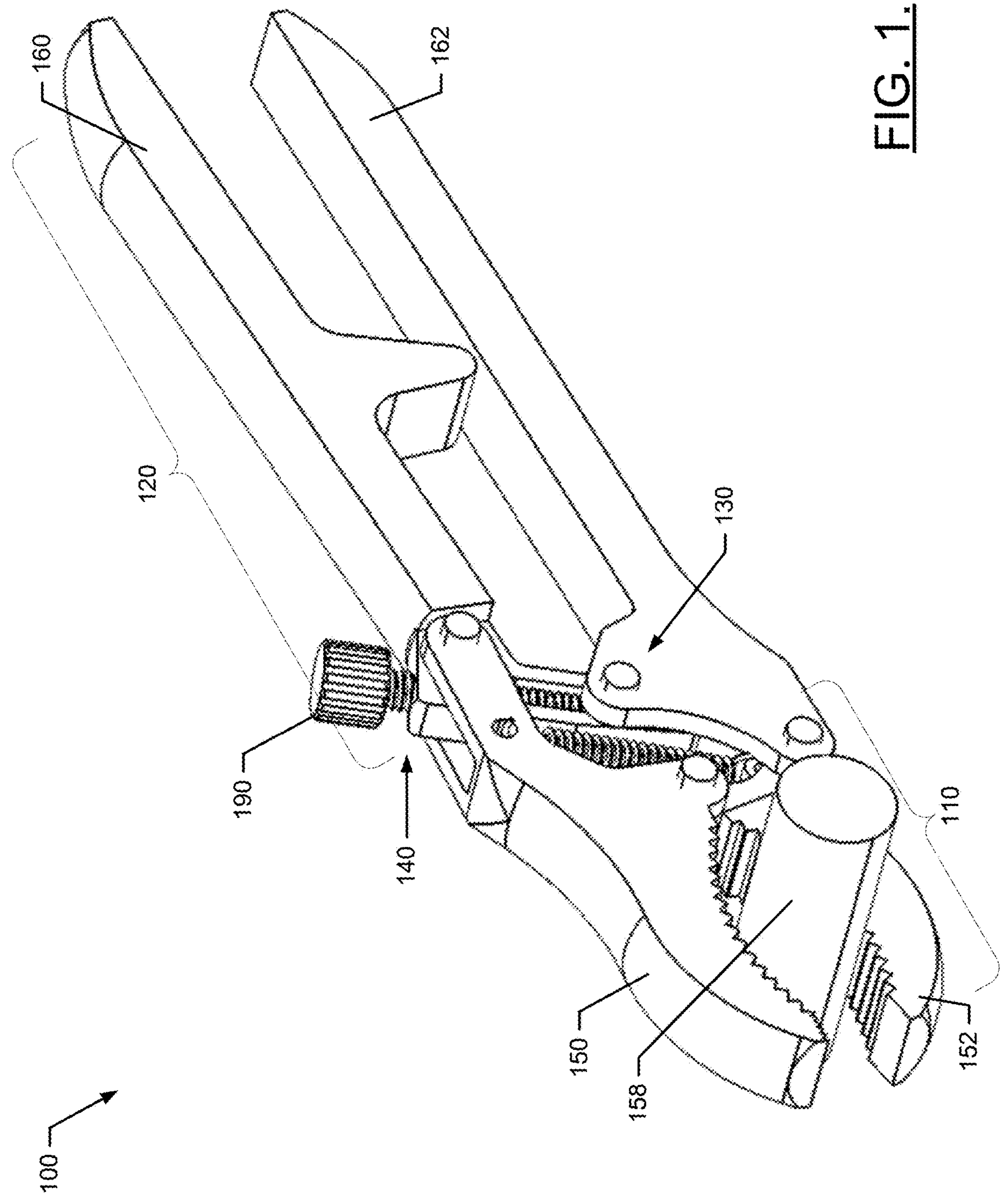
FIG. 1 illustrates a perspective view of a hand tool with an improved adjustment assembly according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a locking pliers that can be adjusted more easily, and possibly even with the same hand that is applying a grip to the handles of the pliers. FIGS. 1-6 show various views or portions of one example of a locking pliers capable of grasping media while still being easily adjustable.

Figure 4:
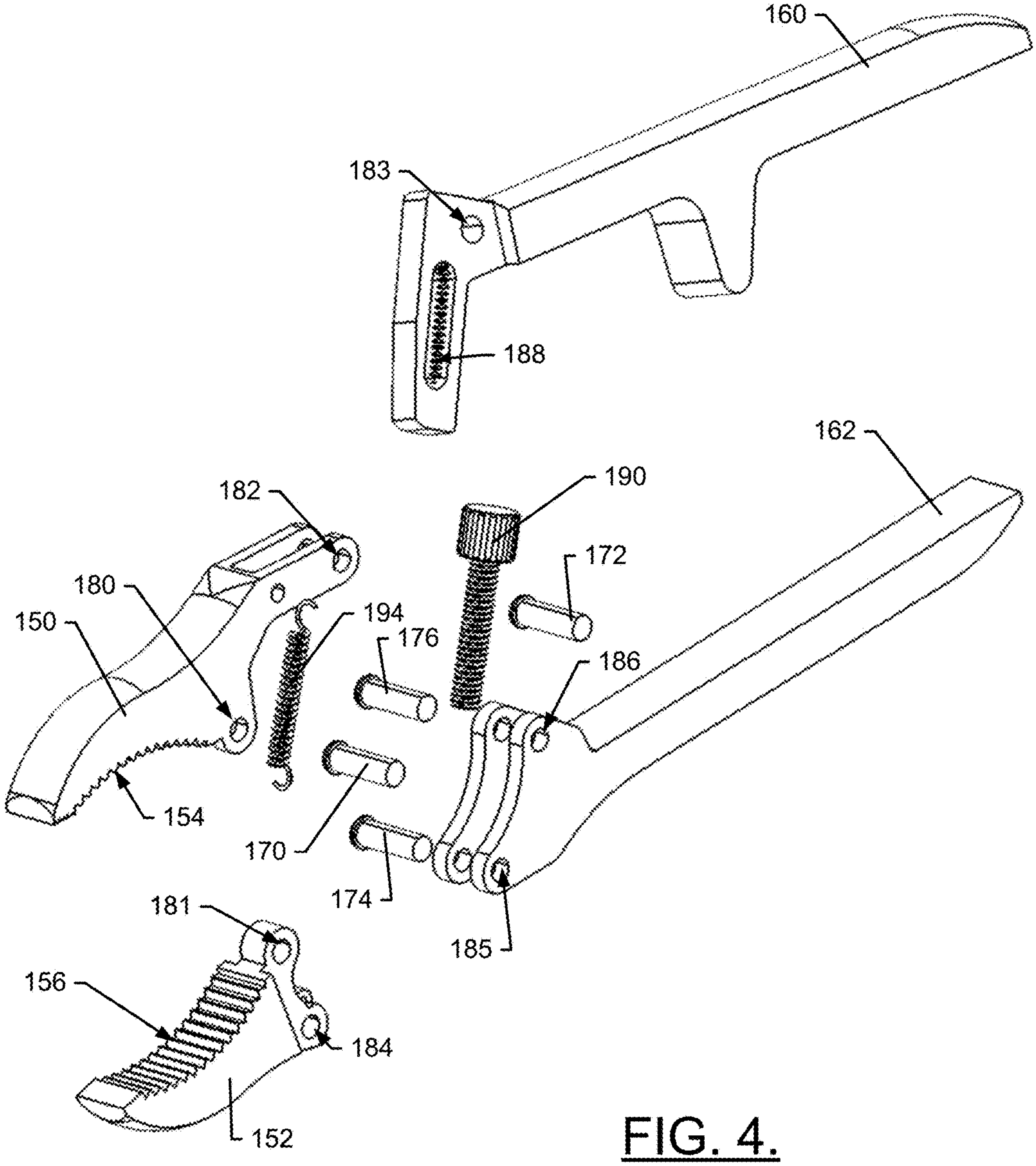
FIG. 4 is a exploded perspective view of the hand tool in accordance with an example embodiment.
Figure 5:
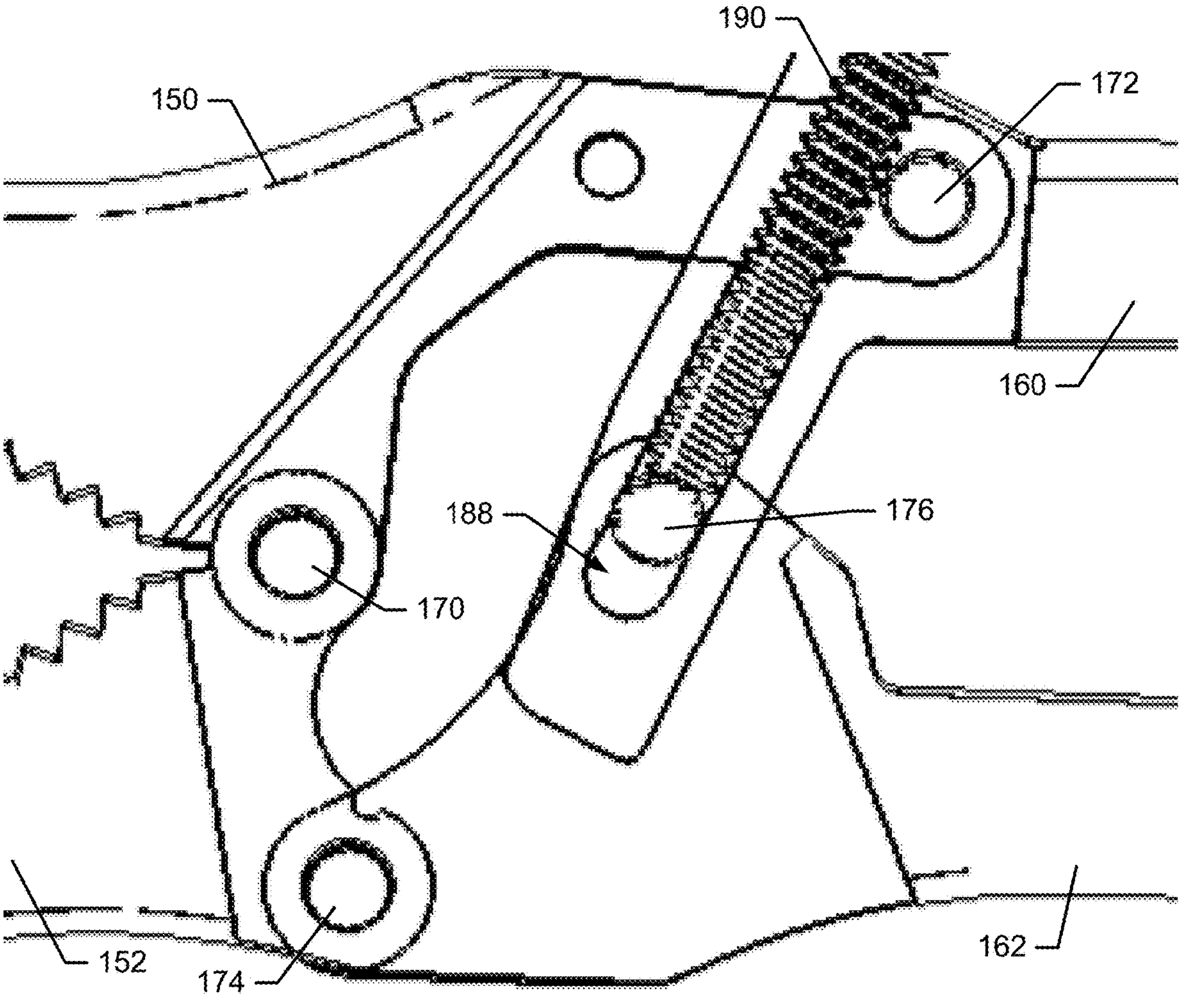
FIG. 5 illustrates a cross section view of the hand tool bisecting the hand tool into two symmetrical halves.
Figure 6:
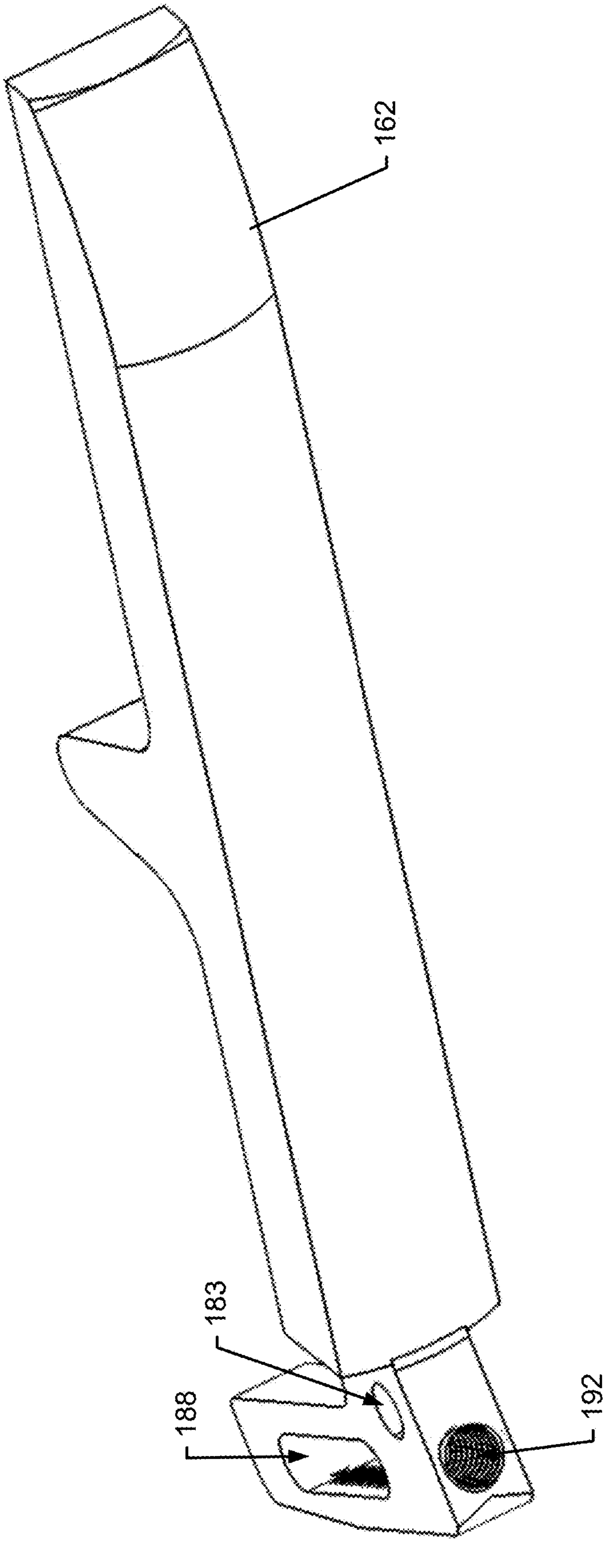
FIG. 6 is a top perspective view of a top handle of the hand tool in accordance with an example embodiment.

In this regard, FIG. 1 illustrates a perspective view of a locking pliers 100 of an example embodiment poised to grip a pipe or other media in accordance with an example embodiment. Meanwhile, FIGS. 2 and 3 each illustrate side views of the locking pliers 100 in a closed (or locked) and open (or unlocked) position, respectively. FIG. 4 illustrates an exploded view of the locking pliers 100. FIG. 5 illustrates a cross section view through the locking pliers 100, and FIG. 6 shows the top handle to better illustrates a threaded receiver and adjustment slot therein.

Referring now to FIGS. 1-6, the locking pliers 100 may include a jaw assembly 110 at a first end thereof, and a handle assembly 120 at a second end thereof. An adjustment assembly 130 may be integrated into the handle assembly 120, along with a clamping assembly 140. Moreover, the clamping assembly 140 and the adjustment assembly 130 may be configured to share components between the respective assemblies in some cases.

The jaw assembly 110 may include a top jaw 150 and a bottom jaw 152 that are configured to face each other with at least one of the top jaw 150 or bottom jaw 152 being movable relative to the other in order to define open and closed positions as defined in greater detail below. Although not required, the top jaw 150 may include an arcuate shaped grip portion 154 that extends from a distal end of the top jaw 150 (relative to the handle assembly 120) toward the handle assembly 120. The grip portion 154 may include transversely extending teeth of similar or different sizes relative to one another. The bottom jaw 152 may also include an arcuate shaped grip portion 156 that extends from a distal end of the bottom jaw 152 (relative to the handle assembly 120). The grip portion 156 may also include transversely extending teeth of similar or different sizes relative to one another (and to the teeth of the grip portion 154 of the top jaw 150). In some cases, the distal ends of the grip portions 154 and 156 may not be arcuate, and may instead be substantially parallel to each other when in the jaw assembly 110 is in the closed position. Media 158 may be placed between the top jaw 150 and bottom jaw 152, and the media 154 may be gripped by the grip portions 154 and 146 via operation of the handle assembly 120.

The handle assembly 120 may include a top handle 160 and a bottom handle 162. In an example embodiment, the handle assembly 120 and the jaw assembly 110, and components thereof, may be pivotally connected to each other via a series of pivot links. For example, the top jaw 150 and the bottom jaw 152 may be pivotally connected to each other via a first pivot link 170. The top handle 160 and the top jaw 150 may be pivotally connected to each other via a second pivot link 172. The bottom jaw 152 and the bottom handle 162 may be pivotally connected to each other via a third pivot link 174. The top handle 160 and the bottom handle 162 may be pivotally connected to each other via a fourth pivot link 176.

The first pivot link 170 may extend laterally through receiving openings 180 formed at a portion of the top jaw 150 (e.g., proximate to an interior end of the grip portion 154). The first pivot link 170 may also pass through an aligned pivot opening 181 formed in the bottom jaw 152 (e.g., proximate to an interior end of the grip portion 156). The top jaw 150 may (at a proximal end thereof with respect to the handle assembly 120) also include a second set of receiving openings 182, which may be aligned with a pivot opening 183 formed at a proximal end of the top handle 160 (relative to the jaw assembly 110) in order to receive the second pivot link 172. The bottom jaw 152 may also include pivot opening 184, which may be aligned with receiving openings 185 formed at a proximal end of the bottom handle 162 to receive the third pivot link 174. The fourth pivot link 176 may be provided through receiving openings 186 formed at the proximal end of the bottom handle 162 (but spaced apart from receiving openings 185) and through adjustment slot 188 formed at the proximal end of the top handle 160 (and spaced apart from the pivot opening 183).

Thus, each of the pivot links defines a pivotal connection between respective components that are joined at the corresponding pivot links. The adjustment assembly 130 and the clamping assembly 140 may cooperate with each other to define how the respective components interface with each other to define a transition between the closed position of FIG. 2 and the open position of FIG. 3.

In this regard, for example, the top jaw 150 and the bottom jaw 152 are pivotally connected by the first pivot link 170, and are drawn closer to each other in the closed position and farther apart from each other in the open position. However, the top and bottom jaws 150 and 152 are spaced apart from each other in the closed position (or locked position) by a selected distance that is variable based on the orientation and positioning of the second and third pivot links 172 and 174, which define how the top and bottom jaws 150 and 152 are oriented relative to one another.

In an example embodiment, the adjustment assembly 130 is structured to be adjustable to define a distance between the second and third pivot links 172 and 174. By increasing the distance between the second and third pivot links 172 and 174, the top jaw 150 and bottom jaw 152 are pivoted about the first pivot link 170 to draw the grip portions 154 and 156 closer together. By decreasing the distance between the second and third pivot links 172 and 174, the top jaw 150 and bottom jaw 152 are pivoted about the first pivot link 170 while maintaining the grip portions 154 and 156 farther apart.

A threaded adjuster 190 is provided as part of the adjustment assembly 130 to move inside a threaded receiver 192 disposed at a proximal end of the top handle 160. The threaded receiver 192 may pass through a top part of the top handle 160 and extend into the adjustment slot 188. Thus, a threaded portion of the adjuster 190 may be visible through exposed portions of the adjustment slot 188. As shown in FIG. 5, a distal end of the adjuster 190 may push on or otherwise engage the second pivot link 172 within the adjustment slot 188. Thus, as the adjuster 190 is inserted farther into the threaded receiver 192, an exposed length (L) of the adjuster 190 (i.e., the amount of the adjuster 190 that extends above the top handle 160) may decrease. Meanwhile, as the adjuster 190 is removed farther from the threaded receiver 192, the exposed length (L) of the adjuster 190 may increase. The threaded receiver 192 may extend into the top handle 160 to form an angle (e.g., an obtuse angle) relative to a longitudinal centerline 195 of the top handle 160.

Whereas the distance between the third and fourth pivot links 174 and 176 is fixed, the distance between the second and fourth pivot links 172 and 176 (and therefore also the distance between the second and third pivot links 172 and 174) is adjustable based on the position of the adjuster 190. In this regard, as the adjuster 190 is inserted into the threaded receiver 192 and the exposed length (L) reduces, the fourth pivot link 176 is pushed farther downward along the adjustment slot 188. Movement of the fourth pivot link 176 downward in the adjustment slot 188 increases the distance between the second and third pivot links 172 and 174, and thereby draws the grip portions 154 and 156 of the top and bottom jaws 150 and 152 closer together.

As the adjuster 190 is removed from the threaded receiver 192 and the exposed length (L) increases, the fourth pivot link 176 is drawn farther upward along the adjustment slot 188. Movement of the fourth pivot link 176 upward in the adjustment slot 188 shortens the distance between the second and third pivot links 172 and 174, and thereby pushes the grip portions 154 and 156 of the top and bottom jaws 150 and 152 farther apart.

In an example embodiment, a biasing member (e.g., spring 194) may be attached between the top jaw 150 and bottom jaw 152 to bias the top and bottom jaws 150 and 152 to the open position. In this regard, the connection points of the spring 194 to the top and bottom jaws 152 may be located between the receiving openings 180 and 182 for the top jaw, and between the pivot openings 181 and 184 for the bottom jaw 152. The spring 194 may draw the bottom jaw 152 toward the top jaw 150 regardless of the position of the adjuster 190, and consequently also tend to compress the top and bottom handles 160 and 162 (e.g., via the connections made by the second and third pivot links 172 and 174) toward each other.

Figure 2:
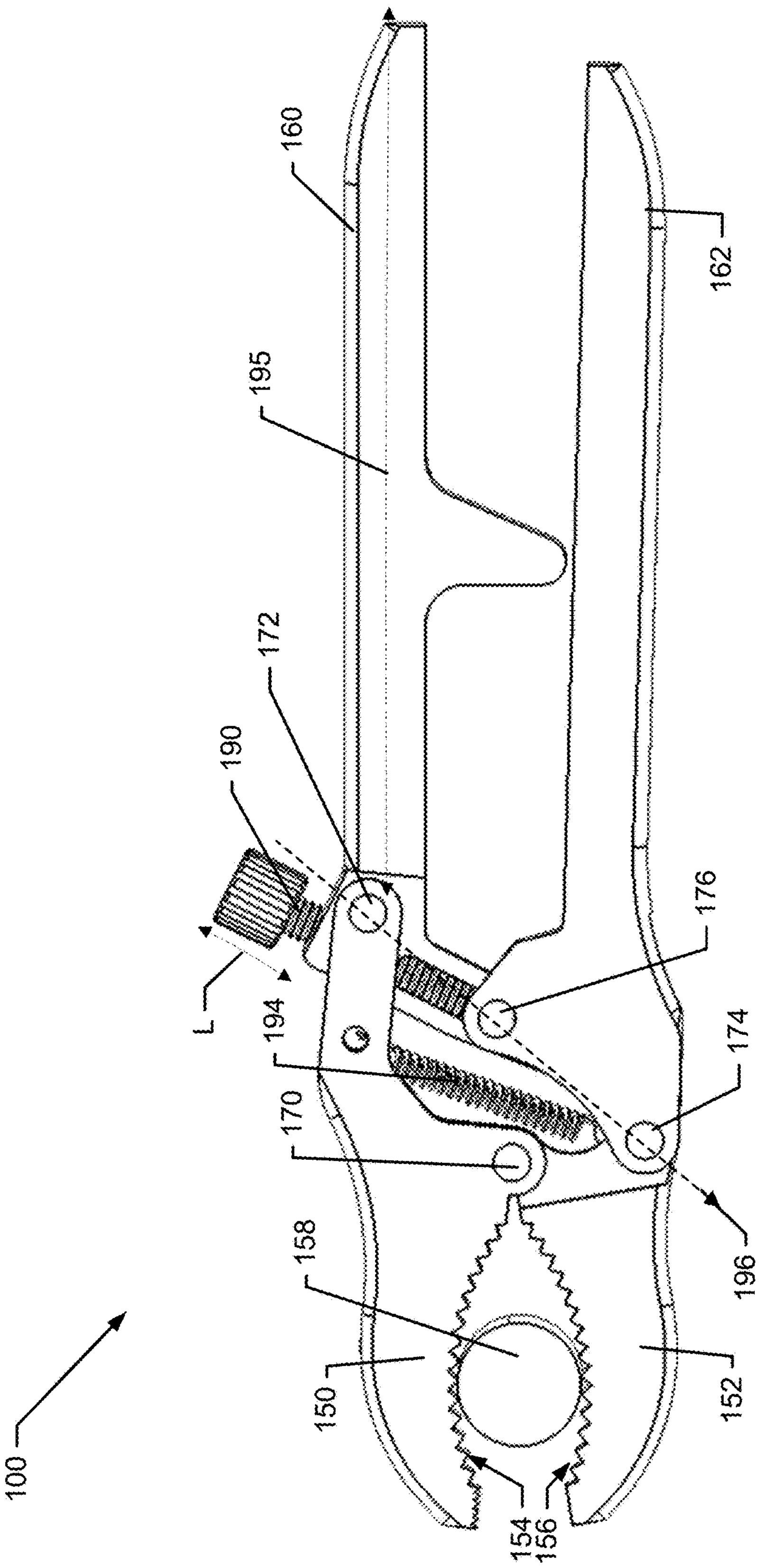
FIG. 2 is a side view of the hand tool of FIG. 1 in a closed position in accordance with an example embodiment.
Figure 3:
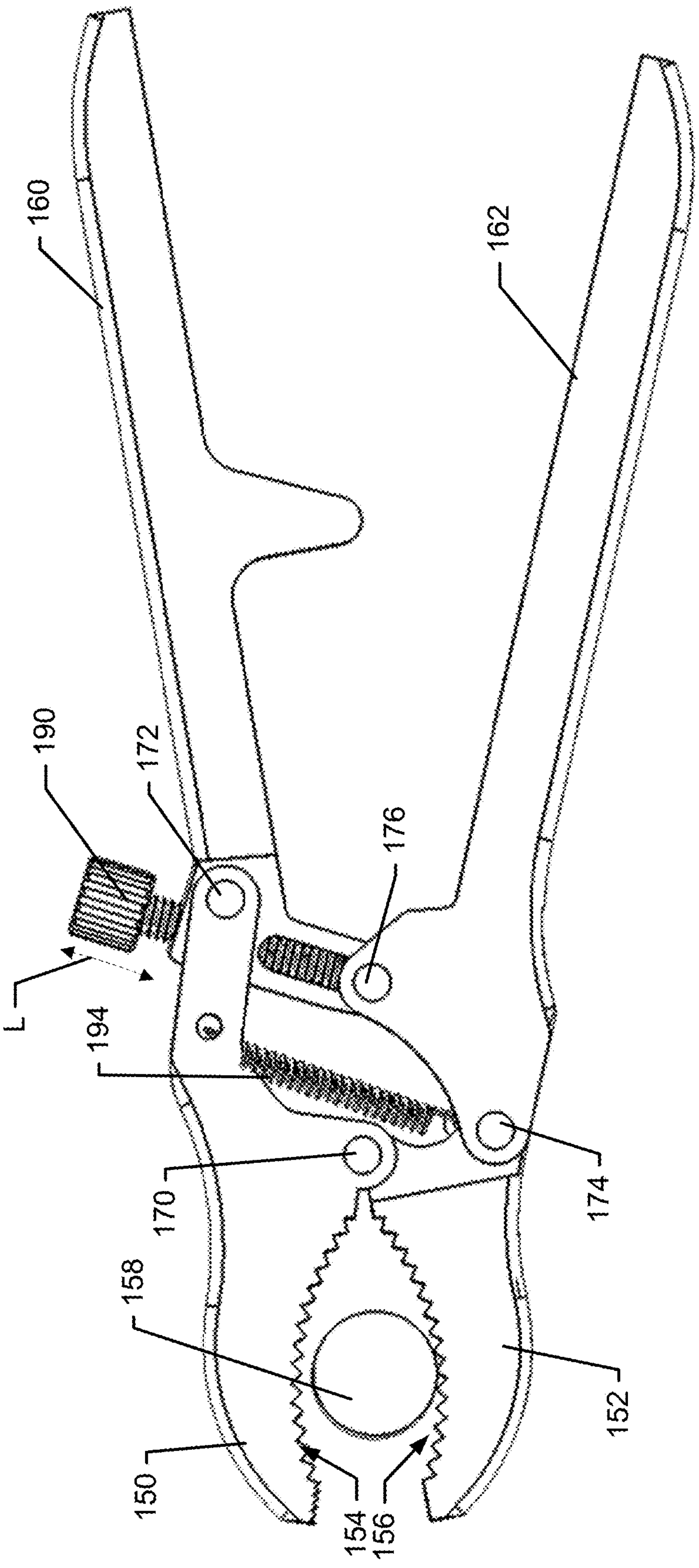
FIG. 3 is side view of the hand tool of FIG. 1 in an open position in accordance with an example embodiment.

As noted above, the distances between the second and third pivot links 172 and 174 effectively determine the bite size of the grip portions 154 and 156 of the top jaw 150 and the bottom jaw 152. However, it can be appreciated that the distance between the second and third pivot links 172 and 174 also changes slightly when the handle assembly 120 is gripped to shift from the open position of FIG. 3 to the closed (or locked) position of FIG. 2. In this regard, when the second, third and fourth pivot links 172, 174 and 176 are out of alignment, as is the case when in the open position, the overall distance between the second pivot link 172 and the third pivot link 174 is slightly smaller than when the second, third and fourth pivot links 172, 174 and 176 are in alignment as shown in FIG. 2 in the closed position. As such, the largest distance between the second and third pivot links 172 and 174 (for any given position of the adjuster 190) is when the second, third and fourth pivot links 172, 174, and 176 are all in alignment with each other as shown by line 196 in FIG. 2. The point of largest distance, may also be the clamping position or locked position for the clamping assembly 140. Thus, when the second, third and fourth pivot links 172, 174, and 176 aligned along line 196, the top and bottom jaws 150 and 152 may be in the locked or closed position.

As can be appreciated from the example of FIGS. 1-6, example embodiments may define a hand tool with an improved capability for grasping media and adjusting the bite size of the jaws with the gripping hand. In this regard, for example, the thumb the same hand of an operator gripping the hand tool 100 may be used to manipulate the adjuster 190 to permit such adjustment during gripping. As such, the hand tool of an example embodiment may include a handle assembly, a jaw assembly, a clamping assembly, and an adjustment assembly. The handle assembly may include a first handle and a second handle that each have a proximal end and a distal end. The jaw assembly may include a first jaw and a second jaw. The first jaw may be pivotally attached to a proximal end the first handle and the second jaw being pivotally attached to a proximal end of the second handle. The clamping assembly may be configured to enable the first and second jaws to be locked at a selected distance from each other in a locked position. The adjustment assembly may be disposed at an intersection of the jaw assembly and the handle assembly. The adjustment assembly may be configured to enable the selected distance to be modified.

The hand tool and/or its components may include a number of modifications, augmentations, or optional additions, some of which are described herein. The modifications, augmentations or optional additions may be added in any desirable combination. For example, the clamping assembly may be disposed between the first and second handles as well. In an example embodiment, the clamping assembly may be disposed at the intersection of the jaw assembly and the handle assembly. In an example embodiment, the first jaw and the second jaw may be pivotally connected to each other at a first pivot link. The first jaw may be operably coupled to the first handle at a second pivot link. The second jaw may be pivotally connected to the second handle at a third pivot link, and the first and second handles may be pivotally connected to each other at a fourth pivot link. In some cases, the first and second jaws may pivot relative to each other about the first pivot link responsive to operation of the clamping assembly to define the selected distance. In an example embodiment, the adjustment assembly may include an adjuster configured to be operable to alternately draw the second and third pivot links closer together to increase the selected distance and push the second and third pivot links farther apart to decrease the selected distance. In some cases, a distance between the third and fourth pivot links is fixed, and a distance between the second and fourth pivot links is adjustable based on a position of the adjuster. In an example embodiment, the adjuster extends through a portion of the first handle proximate to the second pivot link. In some cases, the adjuster may be configured for threaded engagement with a threaded receiver disposed in the portion of the first handle, and the threaded receiver may be formed at an obtuse angle relative to the longitudinal centerline of the first handle. In an example embodiment, the threaded receiver may be disposed at a proximal end of the first handle, and at least a portion of the threaded receiver may extend into an adjustment slot formed in the proximal end of the first handle. In some cases, the fourth pivot link extends through the adjustment slot. In an example embodiment, the fourth pivot link engages a distal end of the adjuster within the adjustment slot to define a distance between the second and fourth pivot links. In some cases, the second, third and fourth pivot links are aligned with each other along a same line when the clamping assembly is in the locked position. In an example embodiment, the second, third and fourth pivot links are not aligned along the same line when the clamping assembly is in the unlocked position. In some cases, a biasing member may be disposed to extend between the first jaw and the second jaw to bias the first and second jaws open. In an example embodiment, the biasing member may include a spring extending from a first point on the first jaw that is disposed between the first pivot link and the second pivot link to a second point on the second jaw that is disposed between the first pivot link and the third pivot link.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand tool comprising:

a handle assembly comprising a first handle and a second handle, each of the first and second handles having a proximal end and a distal end;

a jaw assembly comprising a first jaw and a second jaw, the first jaw being pivotally attached to a proximal end the first handle and the second jaw being pivotally attached to a proximal end of the second handle;

a clamping assembly configured to enable the first and second jaws to be locked at a selected distance from each other in a locked position; and an adjustment assembly disposed at an intersection of the jaw assembly and the handle assembly, the adjustment assembly being configured to enable the selected distance to be modified, wherein the first and second handles are directly pivotally connected to each other at a fourth pivot link, and wherein the fourth pivot link is in direct contact with each of the first and second handles.

2. The hand tool of claim 1, wherein the clamping assembly is disposed at the intersection of the jaw assembly and the handle assembly.

3. The hand tool of claim 1, wherein the first jaw and the second jaw are pivotally connected to each other at a first pivot link, the first jaw is operably coupled to the first handle at a second pivot link, and the second jaw is pivotally connected to the second handle at a third pivot link.

4. The hand tool of claim 3, wherein the first and second jaws pivot relative to each other about the first pivot link responsive to operation of the clamping assembly to define the selected distance.

5. The hand tool of claim 4, wherein the adjustment assembly comprises an adjuster configured to be operable to alternately draw the second and third pivot links closer together to increase the selected distance and push the second and third pivot links farther apart to decrease the selected distance.

6. The hand tool of claim 5, wherein a distance between the third and fourth pivot links is fixed, and a distance between the second and fourth pivot links is adjustable based on a position of the adjuster.

7. The hand tool of claim 6, wherein the adjuster extends through a portion of the first handle proximate to the second pivot link.

8. The hand tool of claim 7, wherein the adjuster is configured for threaded engagement with a threaded receiver disposed in the portion of the first handle, and wherein the threaded receiver is formed at an obtuse angle relative to the longitudinal centerline of the first handle.

9. The hand tool of claim 8, wherein the threaded receiver is disposed at a proximal end of the first handle, wherein at least a portion of the threaded receiver extends into an adjustment slot formed in the proximal end of the first handle, and wherein the fourth pivot link extends through the adjustment slot.

10. The hand tool of claim 9, wherein the fourth pivot link engages a distal end of the adjuster within the adjustment slot to define a distance between the second and fourth pivot links.

11. The hand tool of claim 3, wherein the second, third and fourth pivot links are aligned with each other along a same line when the clamping assembly is in the locked position.

12. The hand tool of claim 11, wherein the second, third and fourth pivot links are not aligned along the same line when the clamping assembly is in the unlocked position.

13. The hand tool of claim 3, wherein a biasing member is disposed to extend between the first jaw and the second jaw to bias the first and second jaws open.

14. The hand tool of claim 13, wherein the biasing member comprises a spring extending from a first point on the first jaw that is disposed between the first pivot link and the second pivot link to a second point on the second jaw that is disposed between the first pivot link and the third pivot link.

15. The hand tool of claim 5, wherein the second pivot link is disposed at an opposite side of the adjuster from the jaw assembly and on a same side of the adjuster as the handle assembly.

16. An adjustment assembly for adjusting an adjustable locking pliers having a handle assembly comprising a first handle and a second handle and a jaw assembly comprising a first jaw and a second jaw, the adjustment assembly comprising:

an adjuster disposed at an intersection of the jaw assembly and the handle assembly;

a threaded receiver; and an adjustment slot, wherein the locking pliers further include a clamping assembly configured to enable the first and second jaws to be locked at a selected distance from each other in a locked position, and wherein the adjuster is configured to interface with the threaded receiver to enable extending or shortening an exposed length of the adjuster based on an amount of the adjuster that is received in the threaded receiver to define the selected distance, wherein the first and second handles are directly pivotally connected to each other at a fourth pivot link, and wherein the fourth pivot link is in direct contact with each of the first and second handles.

17. The adjustment assembly of claim 16, wherein the first jaw and the second jaw are pivotally connected to each other at a first pivot link, the first jaw is operably coupled to the first handle at a second pivot link, the second jaw is pivotally connected to the second handle at a third pivot link.

18. The adjustment assembly of claim 17, wherein the adjuster is configured to be operable to alternately draw the second and third pivot links closer together to increase the selected distance and push the second and third pivot links farther apart to decrease the selected distance, and wherein a distance between the third and fourth pivot links is fixed, and a distance between the second and fourth pivot links is adjustable based on a position of the adjuster.

19. The adjustment assembly of claim 18, wherein the threaded receiver extends into the adjustment slot, wherein the fourth pivot link extends through the adjustment slot, and wherein the fourth pivot link engages a distal end of the adjuster within the adjustment slot to define a distance between the second and fourth pivot links.

20. The adjustment assembly of claim 19, wherein the second, third and fourth pivot links are aligned with each other along a same line when the clamping assembly is in the locked position, wherein the second, third and fourth pivot links are not aligned along the same line when the clamping assembly is in the unlocked position.

* * * * *